(12) United States Patent
Kozyuk et al.

(10) Patent No.: US 10,344,246 B2
(45) Date of Patent: Jul. 9, 2019

(54) OIL DEGUMMING SYSTEMS

(71) Applicant: Arisdyne Systems, Inc., Cleveland, OH (US)

(72) Inventors: Oleg Kozyuk, North Ridgeville, OH (US); Peter Reimers, Shaker Heights, OH (US)

(73) Assignee: ARISYNE SYSTEMS, INC., Cleveland, OH (US)

( * ) Notice: Subject to any disclaimer, the term of this patent is extended or adjusted under 35 U.S.C. 154(b) by 0 days.

(21) Appl. No.: 15/913,012

(22) Filed: Mar. 6, 2018

(65) Prior Publication Data

US 2018/0340132 A1 Nov. 29, 2018

Related U.S. Application Data

(60) Provisional application No. 62/510,398, filed on May 24, 2017.

(51) Int. Cl.
*C11B 3/00* (2006.01)
*B01F 5/06* (2006.01)
(Continued)

(52) U.S. Cl.
CPC ............ *C11B 3/003* (2013.01); *B01F 5/0602* (2013.01); *B01F 5/0682* (2013.01);
(Continued)

(58) Field of Classification Search
CPC ........ C11B 3/003; B01F 5/602; B01F 5/0243; B01F 5/0602; B01F 5/0619; B01F 5/0682; B01F 5/0688; B01F 15/0243; B01J 19/008
See application file for complete search history.

(56) References Cited

U.S. PATENT DOCUMENTS 4,698,185 A   10/1987   Dijkstra et al.
5,426,423 A   6/1995    Raimbault et al.
(Continued)

FOREIGN PATENT DOCUMENTS

CA   2644085 A1   9/2007
EP   2592133 B1   6/2014
(Continued)

OTHER PUBLICATIONS

Gogate et al., A review and assessment of hydrodynamic cavitation as a technology for the future; Ultrasonics Sonochemistry, 2005, vol. 12, pp. 21-27, Elsevier.
(Continued)

*Primary Examiner* — Yate' K Cutliff
(74) *Attorney, Agent, or Firm* — Pearne & Gordon LLP (57) ABSTRACT

A system and method for degumming oil is used to increase oil yield and reduce impurities such as phosphorus. An oil feedstock, water and enzyme mixture is passed through a high shear mixing device prior to being fed to an agitated reactor equipped with a recirculation system. The recirculation system includes a second high shear mixing device that further mixes the oil mixture in the reactor during processing. The reacted mixture is discharged from the reactor to a downstream post-reaction system for separating the degummed oil from the reacted mixture. The separation step can be used to remove the phosphatides and other impurities from the reacted oil to form a purified oil product.

19 Claims, 2 Drawing Sheets

(51) Int. Cl.
*B01F 15/02* (2006.01)
*B01J 19/00* (2006.01)
*C11B 3/06* (2006.01)
*C11B 3/16* (2006.01)
*B01J 19/18* (2006.01)
*B01F 5/00* (2006.01)
*C11B 3/04* (2006.01)

(52) U.S. Cl.
CPC ........ *B01F 5/0688* (2013.01); *B01F 15/0243* (2013.01); *B01J 19/008* (2013.01); *B01J 19/0066* (2013.01); *B01J 19/1806* (2013.01); *C11B 3/06* (2013.01); *C11B 3/16* (2013.01); *B01F 2005/0037* (2013.01); *C11B 3/04* (2013.01)

(56) References Cited

U.S. PATENT DOCUMENTS

| | | | |
|---|---|---|---|
| 5,558,781 A * | 9/1996 | Buchold | C11B 3/003 210/651 |
| 5,696,278 A | 12/1997 | Segers | |
| 5,717,181 A | 2/1998 | Colgate | |
| 5,810,052 A | 9/1998 | Kozyuk | |
| 5,931,771 A | 8/1999 | Kozyuk | |
| 5,937,906 A | 8/1999 | Kozyuk | |
| 5,969,207 A | 10/1999 | Kozyuk | |
| 6,001,640 A | 12/1999 | Loeffler et al. | |
| 6,012,492 A | 1/2000 | Kozyuk | |
| 6,015,915 A | 1/2000 | Jamil et al. | |
| 6,035,897 A | 3/2000 | Kozyuk | |
| 6,172,248 B1 | 1/2001 | Copeland et al. | |
| 6,190,538 B1 | 2/2001 | Gosselink et al. | |
| 7,135,155 B1 | 11/2006 | Long, Jr. et al. | |
| 7,262,311 B2 | 8/2007 | Christianson et al. | |
| 7,713,727 B2 | 5/2010 | Dayton et al. | |
| 7,762,715 B2 | 7/2010 | Gordon et al. | |
| 7,935,157 B2 | 5/2011 | Kozyuk et al. | |
| 8,042,989 B2 | 10/2011 | Gordon et al. | |
| 8,911,808 B2 | 12/2014 | Gordon et al. | |
| 8,945,644 B2 | 2/2015 | Gordon et al. | |
| 9,290,717 B1 | 3/2016 | Kozyuk et al. | |
| 9,321,983 B2 | 4/2016 | Kozyuk | |
| 9,340,749 B1 | 5/2016 | Kozyuk et al. | |
| 9,410,109 B1 | 8/2016 | Kozyuk | |
| 9,453,180 B2 | 9/2016 | Kozyuk et al. | |
| 9,556,399 B2 | 1/2017 | Kozyuk et al. | |
| 9,845,442 B2 | 12/2017 | Kozyuk et al. | |
| 2005/0143590 A1 | 6/2005 | Dawson | |
| 2009/0306419 A1 * | 12/2009 | Myong | C11B 3/001 554/190 |
| 2011/0003370 A1 | 1/2011 | Gordon et al. | |
| 2012/0181216 A1 | 7/2012 | Kozyuk et al. | |
| 2012/0210467 A1 | 8/2012 | Barton et al. | |
| 2013/0011887 A1 | 1/2013 | Dayton et al. | |
| 2013/0062249 A1 | 3/2013 | Kozyuk et al. | |
| 2014/0010725 A1 | 1/2014 | Hassan et al. | |
| 2014/0087042 A1 | 3/2014 | Gordon et al. | |
| 2014/0099687 A1 | 4/2014 | Gordon et al. | |
| 2014/0363855 A1 | 12/2014 | Gordon et al. | |
| 2014/0371476 A1 | 12/2014 | Dayton et al. | |
| 2016/0108338 A1 | 4/2016 | Kozyuk et al. | |

FOREIGN PATENT DOCUMENTS

| | | |
|---|---|---|
| RU | 2288948 C1 | 12/2006 |
| RU | 2333942 C1 | 9/2008 |
| WO | 2016060656 A1 | 4/2016 |

OTHER PUBLICATIONS

Gogate, et al., Cavitation: A technology on the horizon; Current Science, 2006, vol. 91, No. 1, pp. 35-46, Research Account.

Gogate, et al., Engineering Design Methods for Cavitation Reactors II: Hydrodynamic Cavitation; AICHE Journal, 2000, vol. 46, No. 8, pp. 1641-1649.

Kumar, et al., Experimental quantification of chemical effects of hydrodynamic cavitation; Chemical Engineering Science, 2000, vol. 55, pp. 1633-1639, Pergamon.

Pandit, et al., Improve Reactions with Hydrodynamic Cavitation; Chemical Engineering Progress, May 1999, pp. 43-50, www.aiche.org.

Moulton, et al., Continuous Ultrasonic Degumming of Crude Soybean Oil; Journal of American Oil Chemists Society, Jan. 1990, vol. 67, No. 1, pp. 33-38, Springer.

Nano cavitation: a proven new concept; Processing & Technology, Aug./Sep. 2012, www.oilsandfatsinternational.com.

Greyt, et al., Use of Nano Reactors in Edible Oil Processing; 102end AOCS Annual Meeting, May 1-4, 2011, Cincinnati, Ohio Presentation, www.desmetballestra.com.

International Search Report and Written Opinion issued in International PCT Application No. PCT/US2014/070302; dated Jul. 15, 2015.

International Search Report and Written Opinion in parent PCT application PCT/US2015/029388, dated Sep. 30, 2015.

International Search Report and Written Opinion issued in corresponding PCT Application No. PCT/US2018/021703; dated Jun. 20, 2018.

* cited by examiner

OIL DEGUMMING SYSTEMS

This application claims the benefit of U.S. provisional application Ser. No. 62/510,398 filed May 24, 2017, the contents of which are incorporated herein in their entirety by reference.

FIELD

The invention generally relates to processing systems for improved degumming of oils and, in particular, improved processing systems that utilize multi-stage high shear mixing for enzymatic degumming of vegetable oils.

BACKGROUND

Vegetable oils are typically oils that have been pressed or extracted, such as from a vegetable source. Many vegetable oils contain some form of phosphatides (e.g., hydratable or non-hydratable), commonly known as gums. For instance, soybean oil contains about 1-3%, corn oil 0.6-0.9%, sunflower oil 0.5-0.9%, and canola oil (crude) 1-3% of gums.

Gums can be partially or totally removed from vegetable oils through several different known degumming processes. The most commonly used processes in the industry are water degumming, acid degumming, caustic refining and enzymatic degumming, for example, as disclosed in U.S. Pat. Nos. 4,049,686; 5,239,096; 5,264,367; 5,286,886; 6,001,640; 6,033,706; 7,494,676 and 7,544,820, and U.S. Pat. Pub. Nos. 2007/0134777; 2008/0182322 and 2012/0258017.

Other degumming processes include the use of high shear mixers, for example, the processes disclosed in U.S. Pat. Nos. 4,240,972; 4,698,185; 6,172,248 and 8,491,856. It has been proposed to refine vegetable oil using cavitation, such as that disclosed in U.S. Pat. Nos. 8,911,808; 8,945,644 and 9,481,853.

Many conventional processes employ chemical degumming for removal of gums from oil. Recently, more attention has been focused on enzymatic degumming because enzymatic degumming can provide a better oil yield than water, acid, or caustic degumming, and thereby contribute improved economic results. The principle of enzymatic degumming is to convert non-hydratable phospholipids into hydratable phospholipids, which can then be removed by separation processes. The enzymes are in the water phase and interact with the phospholipids at the interface between oil and water. Enzymes exhibiting activity with phospholipids are commonly called phospholipases. The types of phospholipase are based on the position on the phospholipid molecule at which the enzyme reacts, and are known as PLA1, PLA2, PLC, PLB and PLD.

The typical enzymatic degumming process for vegetable oils includes four main steps. First, the pH of the vegetable oil is adjusted with an aqueous acid and caustic to a value of 3 to 7 and the phospholipids are brought from the oil to an oil/water interface, by obtaining a vegetable oil-water emulsion. The vegetable oil-water emulsion and an aqueous enzyme solution is then dispersed together to enzymatically degum the vegetable oil. The mixture is stirred in an enzymatic reactor to facilitate enzymatic degumming of the vegetable oil at a temperature of 20° to 90° C. to obtain a liquid which contains degummed vegetable oil and a watery sludge. The liquid is further processed to separate the degummed oil from the watery slude.

While enzymatic degumming offers significant advantages to oil processors, it also poses certain disadvantages. One disadvantage is that the reaction of the enzyme with the phospholipids can be slow and time consuming. In particular, the reaction of the enzymes with phospholipids can take 2 to 6 hours, depending on reaction variables such as pH, temperature, relative concentrations, and mixing conditions. PLA, for instance, generally requires a reaction time of at least about 4 hours, while PLC requires a reaction time of about 2 hours. The processes can require an enzymatic reactor tank for housing the mixture for period of 2-6 hours, depending on the quality of the incoming oil. Such prolonged reaction times can have a significant negative impact on the overall efficiency and economic value of enzymatic degumming processes. While enzymatic treatment processes show good potential, the present invention provides solutions for improving oil degumming processes that overcome known disadvantages.

SUMMARY

In a first aspect, there is an enzymatic degumming system, the system includes a first high shear mixing device having an inlet and an outlet, the first high shear mixing device connected to a feed supply that includes an oil with non-hydrated phospholipids, water and enzyme, wherein the first high shear mixing device is capable of mixing the feed supply to produce pre-mixed feed stock; a reactor having a reactor inlet, a reactor outlet, a mixing chamber and an agitator arranged in the mixing chamber, the reactor outlet connected to a recirculation system positioned outside the reactor; the recirculation system including a pump with a pump inlet and a pump outlet, the pump inlet in fluid communication with the outlet of the reactor and the outlet of the first high shear mixing device; a second high shear mixing device having an inlet and an outlet, the inlet of the second high shear mixing device in fluid communication with the pump outlet and the outlet of the second high shear mixing device in fluid communication with the reactor inlet.

In some examples of aspect 1, at least one or both of the first high shear mixing device and the second high shear mixing device is selected from a group of a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device.

In another example of aspect 1, at least one of the first high shear mixing device and the second high shear mixing device in an inline device, for example, a hydrodynamic cavitation device. The hydrodynamic cavitation device can be a static device having a local constriction (e.g., nozzle, orifice) for generating cavitation in the feed supply to for an oil and water emulsion.

In another example of aspect 1, the oil is selected from the group of vegetable oil, acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil, walnut oil and a combination thereof.

In another example of aspect 1, the feed supply further includes a pH adjuster reagent, for example, an acid or aqueous acid solution.

In another example of aspect 1, the feed supply further includes a base selected from the group of sodium hydroxide, potassium hydroxide, sodium silicate, sodium carbonate, calcium carbonate, and a combination thereof.

In another example of aspect 1, the reactor is in fluid communication with a downstream post-reaction network that contains a heat exchanger and a separator.

In another example of aspect 1, the flow capacity of the first high shear mixing device is greater than the second high shear mixing device.

In another example of aspect 1, at least one or both of the first high shear mixing device and the second high shear mixing device is a static hydrodynamic cavitation device.

In another example of aspect 1, the reactor in fluid communication with a second reactor, wherein the second reactor is directly downstream of the first reactor.

In a second aspect, there is a method for degumming an oil, the method includes passing a feed supply through a first high shear mixing device to form a pre-mixed feedstock, the feed supply includes an oil containing non-hydrated phospholipids, water, a pH adjuster reagent, a base and enzyme; charging the pre-mixed feedstock to a mixing chamber of a reactor to form a reaction mixture; mixing the reaction mixture in the mixing chamber of the reactor with an agitator; recirculating the reaction mixture in the mixing chamber repeatedly through a recirculation system positioned outside of the reactor, the recirculation system includes a second high shear mixing device, wherein the recirculation system reintroduces the reaction mixture to the reactor to form a reacted mixture; discharging the reacted mixture from the reactor to a downstream post-reaction network that includes a heat exchanger and a separator; and passing the reacted mixture through the heat exchanger and separator, wherein the separator generates a degummed oil product.

In some examples of aspect 2, the oil is a crude vegetable oil or a water-degummed vegetable oil and the pH adjuster reagent is an aqueous acid solution.

In another example of aspect 2, the oil of the degummed oil product contains less than 5 ppm of phosphorus and the oil in the feed supply contains greater than 500 ppm.

In another example of aspect 2, the pre-mixed feedstock is passed through the recirculation system before being introduced into the mixing chamber of the reactor.

In another example of aspect 2, the recirculating system further includes a pump having a pump inlet and a pump outlet.

In another example of aspect 2, the pre-mixed feedstock and the reaction mixture are combined together in the second high shear mixing device.

In another example of aspect 2, at least one or both of the first high shear mixing device and the second high shear mixing device is selected from a group of a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device. For example, one or both of the first high shear mixing device and the second high shear mixing device can be a hydrodynamic cavitation device. The hydrodynamic cavitation device can be a static device having a local constriction (e.g., nozzle, orifice) for generating cavitation in the feed supply to for an oil and water emulsion.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawing is included to provide a further understanding of principles of the disclosure, and is incorporated in and constitutes a part of this specification. The drawing illustrates some examples(s), and together with the description serves to explain, by way of example, principles and operation thereof. It is to be understood that various features disclosed in this specification and in the drawing can be used in any and all combinations. By way of non-limiting example the various features may be combined with one another as set forth in the specification, above, as aspects.

BRIEF DESCRIPTION OF THE DRAWING

The above and other features, examples and advantages of aspects of the examples disclosed in the present specification are better understood when the following detailed description thereof is read with reference to the accompanying drawing, in which.

DETAILED DESCRIPTION

The terminology as set forth herein is for description of the embodiments only and should not be construed as limiting the invention as a whole. Herein, when a range such as 5-25 (or 5 to 25) is given, this means preferably at least 5 and, separately and independently, preferably not more than 25. In an example, such a range defines independently not less than 5, and separately and independently, not less than 25.

A method has been discovered for an efficient, cost-effective oil degumming process by use of a multiple high shear mixing devices in combination with a reactor. The oil to be treated is pre-mixed with water, enzyme and at least a reagent, e.g., an acid and water, and optionally a base, to form a feed supply. It has been found that by maintaining a reaction mixture in an enhanced mixed state through a recirculation system having a second high shear mixing device can improve transfer of impurities, such as phosphorus, out of the oil and decrease the residence time of the oil in the reactor to achieve the desired purity. As such, increased impurity removal can be achieved by the methods of this disclosure while improving efficiency and reducing cost.

Figure 1:
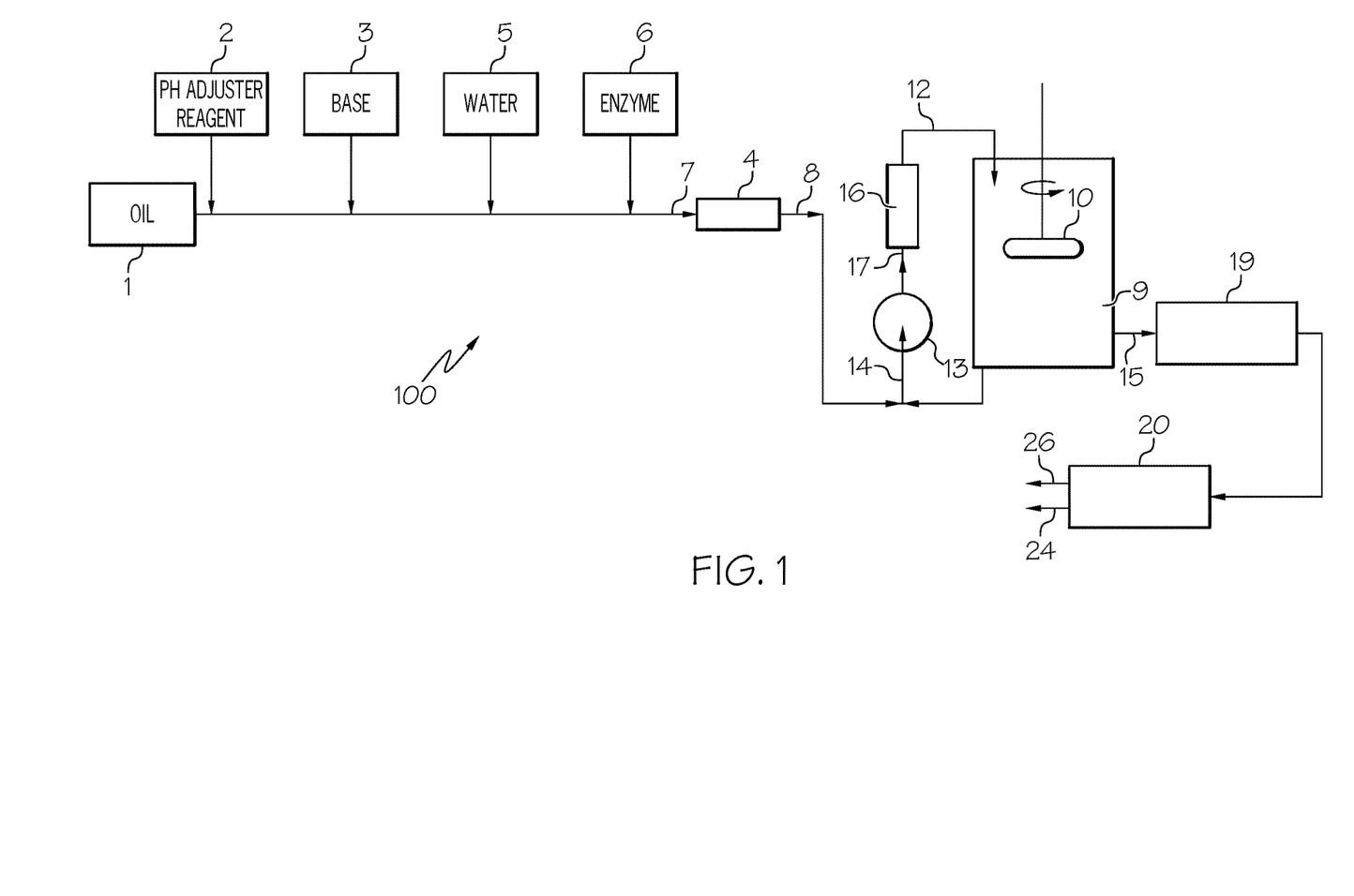
FIG. 1 shows a block flow diagram of an enzymatic oil degumming system using high shear mixing devices.

As illustrated in the diagram of FIG. 1, one embodiment of a method for degumming oils can include multiple stages. As shown in the drawing, pipes, hoses, or other conventional, industrial equipment can be used to facilitate the fluid communication of the elements and streams discussed below.

Oil is shown as stream 1 in FIG. 1. The oils that can be degummed include vegetable oils, such as crude vegetable oil or water-degummed oil. Examples of vegetable oils can include, for example, acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil, walnut oil or combinations thereof.

The phosphatide or phosphorus content of the oil 1 can be in the range of 30 to 1,200 ppm, 100 to 800 ppm, 200 to 600 ppm or 300 to 500 ppm. The phosphatide content (or also referred to as phospholipid content), as used herein, is expressed as ppm phosphorus in oil. In an example, the phosphatide content of crude oil, such as vegetable crude oil, can be in the range of 200 to 1,200 ppm phosphorus or as noted above. In another example, the phosphatide content of previously water-degummed oil, such as water-degummed vegetable oil, can be in the range of 30 to 200 ppm or 50 to 150 ppm phosphorus.

The oil 1 can be optionally heated prior to the degumming method (not shown), such as prior to acid being added to form an acid-treated oil. For example, the oil can be passed through a heat exchanger, such as a plate and frame heat exchanger, to increase or decrease the temperature of the oil as desired. The oil can be heated to a temperature in the range of 20 to 100° C., or at least to 30, 40, 50, 60, 70, 80, 90 or 100° C. Preferably, the oil is maintained at a temperature in the range of 40 to 95° C. during the degumming process as deemed suitable to one skilled in the art.

A pH adjuster reagent, for example an acid, such as an aqueous acid solution, can be added to the oil to be degummed to form a feed supply 7. Acids can promote hydration of the non-hydrated phosphatides contained in the oil. The acid is shown as stream 2. The acid can include an inorganic or organic acid, for example, phosphoric acid, hydrochloric acid, sulfuric acid, ascorbic acid, acetic acid, citric acid, fumaric acid, maleic acid, tartaric acid, succinic acid, glycolic acid or a combination or mixture thereof. The acid is used in range from about 50 to 500 ppm as measured by weight of the oil. For example, a high concentration acid in water solution can be used, such as a 75 to 85 weight percent phosphoric acid water solution. In another example, the acid can be used in range from at least 0.02 to 0.2 percent by weight based on total weight of the oil in the feed supply. Concentrated acid solutions, for instance, between 50 and 90 weight percent, can be used to reduce the amount of volume of acid solution being added. The pH adjuster reagent can be stored in a working or holding tank prior to being added to the oil 1.

Feed supply 7 further includes a base 3. A base 3, such as in an aqueous base solution, can be added to and mixed with the oil 1 to form feed supply 7, for example before being passed through a first high shear mixing device. The base 3 can be added to neutralize the oil, for instance, to bring the pH of the mixture to a range of 5 to 8, and preferably 6 to 7. The base can promote the neutralization of free fatty acids contained in the oil. The base 3 can be stored in a working or holding tank prior to being added to the oil.

The base 3 can include sodium hydroxide, potassium hydroxide, sodium silicate, sodium carbonate, calcium carbonate, or combinations thereof. The base can be used in range from at least 0.02 to 0.2 percent by weight based on total weight of the oil in the feed supply. Concentrated base solutions, for instance, between 30 and 50 weight percent, can be used to reduce the amount of volume of base solution being added. Optionally, dilute solutions of base, for example 5 to 20 weight percent, can be used. Beyond the stoichiometric amount of base required to neutralize the acid and free fatty acids in the feed supply, surplus base can be added, for example, to adjust for certain oils to be degummed and the quality thereof.

The feed supply includes water. Water can be added as a separate component to the feed supply, for example as shown by water 5 in FIG. 1, or as part of the pH adjuster reagent 2, base 3, enzyme 6 or combinations thereof. In some embodiments, total water in the feed supply is made up an aqueous pH adjuster reagent, an aqueous base solution and an aqueous enzyme mixture. The feed supply can contain water in the range of 1 to 20 weight percent, 1.5 to 15 weight percent, 2 to 12 weight percent, 2.5 to 10 weight percent, or 3, 3.5, 4, 4.5, 5, 6, 7, 8, or 9 weight percent based on the total weight of the oil in the feed supply. The water 5 can be stored in a working or holding tank prior to being added to the oil.

The feed supply further includes enzyme 6 as known in the art for use in degumming oils. Enzymes exhibiting activity with phospholipids, or phospholipases, are preferred. Solutions or mixtures of enzymes 6 in water can be dilute with low concentrations of enzyme and added to the other components to make the feed supply, and those enzyme solutions are preferably more dilute than aqueous solutions of acid or base as used in oil degumming. On a molar basis, the dispersion of the enzyme solution or mixture should be fine since the low concentration of enzymes and enzyme stearic requirements can lead to a lower Arrhenius factor for enzymatic reactions. In some embodiments, the solutions or mixtures of enzymes 6 includes phospholipase A1, phospholipase A2, phospholipase B, phospholipase C, phospholipase D, or any combination thereof. In other embodiments, the dispersion of the enzyme in solution or mixture 6 can be in the range of 0.025 to 2 weight percent, 0.05 to 1.5 weight percent, 0.075 to 1 weight percent, 0.1 to 0.5 weight percent, or 0.15, 0.2, 0.25, 0.3, 0.35, 0.4 or 0.45 weight percent.

In some embodiments, the feed supply 7 can be formed by mixing the oil, pH adjuster reagent, base, water and enzyme components together at a single time. In other embodiments, the components can be mixed in any combination or in any order. For example, the pH adjuster reagent 2 can be added to the oil 1 in a first step, then base 3 can be added, followed by enzyme and optionally a separate water addition.

In certain embodiments, feed supply 7 can be stored prior to being introduced to the degumming system 100. The storage can include the supply being retained in a tank or vessel, optionally with an agitator for maintaining the contents in a homogenous mixture. The tank can be jacketed or equipped with another heating apparatus, such as coils, for maintaining a desired holding temperature (not shown). The feed supply can be introduced and processed in the degumming system at the temperature of about 20, 30, 40, 50 60, 70, 80, 90, 100 or 110° C. In some embodiments, the feed supply 7 is introduced to the degumming system at a temperature in the range of 20 to 60, or 30 to 50° C. The feed supply can be stored for a suitable period of time, for example, 1 minute to 48 hours, 30 minutes to 24 hours, 45 minutes to 2 hours, or for one hour.

The feed supply 7 is passed through a first high shear mixing device 4. The feed supply 7 can be fed to the device 4 by a pump (e.g., a centrifugal or positive displacement pump). Preferably, the feed supply 7 is fed to the device 4 at a pre-determined inlet pressure, for example, in the range of 100 to 2,000 psi, or at least 150, 200, 300, 400, 500, 600, 700 or 800 psi. As shown in FIG. 1, the first high shear mixing device 4 can have an inlet and an outlet. As the feed supply 7 passed through the first high shear mixing device 4, a pre-mixed feed stock 8 is formed and discharged from the device 4 through its outlet. Preferably, the pre-mixed feed stock 8 is an emulsion of oil and water. The emulsion promotes interaction of the enzymes in the feed stock 8 with the phospholipids of the oil 1, thereby enhancing the transformation of the non-hydrated phospholipids into water-soluble lyso-phospholipids.

The first high shear mixing device 4 can be, for example, a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device.

In some embodiments, the device 4 can form a hydrodynamic cavitation field in the feed supply 7 downstream of a local constriction in the device 4. The hydrodynamic cavitation field can contain cavitation bubbles. In general, cavitation can be described as the generation, subsequent growth and collapse of cavitation bubbles and cavities. During the collapse of the cavitation bubbles, high-localized pressures and temperatures are achieved, with some estimations of 5000° C. and pressure of approximately 500 kg/cm$^2$ (K. S. Suslick, Science, Vol. 247, 23 Mar. 1990, pgs. 1439-1445). High temperatures and pressures can stimulate the progress of various chemical reactions which may not be possible under ordinary conditions, such as standard temperature and pressure, STP. Therefore, a material may undergo physical changes under the influence of cavitation energy.

The local constriction in the hydrodynamic cavitation device 4 can be an orifice, baffle, bluff body or nozzle. The orifice can be any shape, for example, cylindrical, conical, oval, right-angled, square, etc. Depending on the shape of the orifice, this determines the shape of the cavitation fluid jets flowing from the localized flow constriction. The orifice can have any diameter, for example, the diameter can be greater than 0.1, 0.2, 0.3, 0.4, 0.5, 0.6, 0.8, 1, 2, 3, 5, or 10 mm, and preferably more less than 2, 1.5, 1 or 0.8 mm. In one example, the diameter of the orifice can be about 0.3 mm, 0.4 mm or about 0.5 mm. For multi-stage cavitation, two or more local constrictions, such as an orifices, can be in series, for example at least 2, 3, 4 or 5 orifices can be in series.

Preferably, the hydrodynamic cavitation device 4 is a static device that produces cavitation by passive means. Examples of static cavitational energy sources that can be used to apply cavitational energy to the pre-treated oil mixture include, but are not limited to, static mixers, orifice plates, perforated plates, nozzles, venturis, jet mixers, eductors, cyclonettes (e.g., Fluid-Quip, Inc.), and control flow cavitation devices (e.g., Arisdyne Systems, Inc.), such as those described in U.S. Pat. Nos. 5,810,052; 5,931,771; 5,937,906; 5,971,601; 6,012,492; 6,502,979; 6,802,639; 6,857,774 and 7,667,082.

The hydrodynamic cavitation field downstream of the local constriction is generated as the processing pressure of the feed supply 7 is reduced after passing through the local constriction. Maintaining a pressure differential across the local constriction allows control of the cavitation intensity in the first high shear mixing device 4. The pressure differential across the local constriction is preferably at least 100, 125, 150, 170, 200, 300, 400, 500, 600, 700, 800, 850, 900, or 1000, psi. Velocity of feed supply 7 through the local constriction in the cavitation device 4 is preferably at least 1, 5, 10, 15, 20, 25, 30, 40, 50, 60 or 70 meters per second (m/s). The pressure drop in the feed supply 7 can be measured across the hydrodynamic cavitation device 4, which includes the pressure drop across all flow constrictions contained therein. The pressure drop in the feed supply 7 across the hydrodynamic cavitation device can be in the range of 60 to 80 percent of the pre-determined inlet pressure to the device 4, or at least 65, 70 or 75 percent. In one embodiment, the pressure drop in the feed supply 7 across the hydrodynamic cavitation device 4 can be at least 100, 150, 200, 250, 300, 500 or 750 psi.

The cavitation bubbles formed by passing the feed supply 7 through the local constriction of the hydrodynamic cavitation device 4 are collapsed under the influence of static pressure. Energy emitted during collapse of the cavitation bubbles is directly proportional to magnitude of static pressure in surrounding liquid bubbles. Therefore, magnitude of the static pressure is directly related to energy emitted during cavitation bubbles collapse and better dispersion effect. The collapsing of the cavitation bubbles in the hydrodynamic cavitation field forms a pre-mixed feed stock 8 having non-hydrated phospholipids from oil 1.

The feed supply 7 can be passed through the hydrodynamic cavitation device 4 described herein as a single pass process or a multi-pass process to subject the feed supply to more than one hydrodynamic cavitation. For example, the steps of passing the supply 7 through the device 4, forming a field of hydrodynamic cavitation bubbles and collapsing the bubbles can be repeated one, two, three or four times prior to transferring the processed oil mixture to reactor 9. To create a multi-pass cavitation process the feed supply 7 can be recycled repeatedly through the device 4 via a recirculation loop. Alternatively, two or more devices 4 can be positioned in series to produce a multi-pass cavitation process.

The feed supply 7 can have a reduced residence time in the field of hydrodynamic cavitation bubbles. For example, the supply 7 can have a residence time in the field of hydrodynamic cavitation bubbles of less than $10\times10^{-5}$ seconds, less than $9.5\times10^{-5}$ seconds, less than $9\times10^{-5}$ seconds, less than $8.5\times10^{-5}$ seconds, less than $8\times10^{-5}$ seconds, less than $7\times10^{-5}$ seconds, less than $6\times10^{-5}$ seconds, less than $5\times10^{-5}$ seconds, or less than $4\times10^{-5}$ seconds or less. Reduced residence time in the device 4 can be achieved by controlling velocity through the local constriction, downstream static pressure, or combinations thereof. In some embodiments, reduced residence time in the field of hydrodynamic cavitation bubbles can result in the phospholipids (e.g., reacted phospholipids) remaining in the oil 1 of the feed supply 7 and formed pre-mixed feed stock 8 and not transferring to other non-oil components of the streams 7, 8.

Without being bound by any particular theory, it is believed that acid reacts with the non-hydratable phosphatides in the oil and decompose them. Because reagents (e.g., acid) can be diluted in an aqueous solution, such as an aqueous acid solution, a fine dispersion of the oil and reagent solution is desired. A fine dispersion is preferable when the reaction has to be near completion and low residual phosphatides and impurity content has to be reached, for example, below 10 to 2 ppm of phosphorus.

The pre-mixed feed stock 8 can be transferred directly to a reactor 9, e.g., a mass transfer reactor, for carrying out the degumming process and conversion of non-hydrated phospholipids to hydrated phospholipids that can be separated to form a purified oil product. The reactor 9 can be any suitable vessel, for example, a tank. The reactor 9 can be equipped with a means 10 for mixing contents therein. Mixing means can include agitators, mixers, impellers or the like, for instance, an top-mounted impeller on a metal tank. The reactor can be jacketed or equipped with another heating apparatus, such as coils, for maintaining a desired holding temperature (not shown).

In some embodiments, the reactor 9 can be directed connected to the first high shear mixing device 4 such that the outlet of the device 4 is in direct fluid communication with an inlet of the reactor 9. Preferably, the pre-mixed feed stock 8 does not contain cavitation bubbles as it resides in the reactor 9. In some embodiments, the pre-mixed feed stock 8 is passed through a second high shear mixing device 16 prior to being introduced into reactor 9. The feed stock 8 can be fed to reactor 9 by a pump (e.g., a centrifugal or positive displacement pump). As shown in FIG. 1, the second high shear mixing device 16 can have an inlet and an outlet.

The second high shear mixing device 16 can be, for example, a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device. In some embodiments, the device 16 can form a hydrodynamic cavitation field in the pre-mixed feed stock 8 downstream of a local constriction in the device 16. The hydrodynamic cavitation field can contain cavitation bubbles. The local constriction of device 16 can be the same as described above with regard to the first high shear mixing device 4.

As shown in FIG. 1, the second high shear mixing device 16 can be a component of a recirculation system connected to reactor 9 for recirculating the contents of the mixing chamber of reactor 9. Thus, the pre-mixed feed stock 8 can be directly fed to the recirculation system, which charged the stock 8 to an inlet of reactor 9. The recirculation system can include equipment for transferring reactor contents through the system and back into the reactor 9. For example, a recirculation pump can be in fluid communication with an outlet of reactor 9. Contents in reactor 9, e.g., reacted mixture contained in the mixing chamber of the reactor, can be directly fed to the inlet of the recirculation pump 13. The recirculation pump 13 transfers reactor 9 contents through the second high shear mixing device 16 and back into reactor 9. Preferably, the reactor 9 contents are fed to the device 16 at a pre-determined inlet pressure, for example, in the range of 100 to 2,000 psi, or at least 150, 200, 300, 400, 500, 600, 700 or 800 psi. During operation, the contents of the reactor (e.g., reacted mixture) are fed through the recirculation system and, in turn, through the second high shear mixing device 16 multiple times prior to the reacted mixture being discharged from the reactor for further processing. In some embodiments, the reactor contents are passed through the recirculation system at least 5, 10, 15, 20, 25, 30, 35, 40, 45, 50, 60, 70, 80, 90 or 100 times.

As shown in FIG. 1, in some embodiments, the contents of reactor 9 can be discharged to the recirculation system positioned outside of the reactor and combined with pre-mixed feed stock 8, shown as stream 14, prior to entering the inlet to recirculation pump 13. The reactor contents and the pre-mixed feed stock 8 can be combined by conventional equipment (e.g., a three-way valve) or by connecting pipes at or near the recirculation pump inlet. The recirculation pump 13 transfers the reactor contents, or a combination of the reactor contents and pre-mixed feed stock 8, shown as stream 17, to the second high shear mixing device 16.

The recirculation system contents (e.g., stream 17) are passed through device 16 at an inlet pressure as discussed herein, for example, in the range of 100 to 2,000 psi, or at least 150, 200, 300, 400, 500, 600, 700 or 800 psi. The pressure differential across device 16, for instance the local constriction of a hydrodynamic cavitation device, is preferably at least 100, 125, 150, 170, 200, 300, 400, 500, 600, 700, 800, 850, 900, or 1000, psi. Velocity of stream 17 through device 16 is preferably at least 1, 5, 10, 15, 20, 25, 30, 40, 50, 60 or 70 meters per second (m/s).

In some embodiments, cavitation bubbles formed by passing the stream 17 through the local constriction of the hydrodynamic cavitation device 16 are collapsed under the influence of static pressure. Energy emitted during collapse of the cavitation bubbles is directly proportional to magnitude of static pressure in surrounding liquid bubbles. Therefore, magnitude of the static pressure is directly related to energy emitted during cavitation bubbles collapse and better dispersion effect. The collapsing of the cavitation bubbles in the hydrodynamic cavitation field forms an emulsion of water and oil in stream 12 having non-hydrated phospholipids from oil 1, which is returned to reactor 9 for further mixing and reaction. The reaction mixture can be continually recycled through the recirculation system during the entire reaction process, for example, for a period of 30 minutes to 24 hours, 60 minutes to 12 hours, 90 minutes to 6 hours, or 2, 3, 4 or 5 hours.

The reaction process in reactor 9 converts non-hydrated phospholipids contained in oil 1 of the feed supply 7 to hydratable phospholipids by use of a low shear agitator 10 disposed inside the mixing chamber of the reaction and the recirculation system located outside the reactor. The use of first and second high shear mixing devices 4, 16, such as inline devices, incorporates intensification of the enzymatic reaction in the reactor 9 and enhances the mass transfer process of impurities from the oil phase to the water phase of the emulsion. The impurities are converted into water-soluble components (e.g., water soluble lyso-phospholipids) that are more easily retained in the water phase of the reaction mixture. The formed and maintained fine oil and water emulsion provides a constant oil and water interface for the enzymes to react with the phospholipids. Because the mechanical low shear mixing or agitation in the reactor maintained throughout the reaction can result in the de-coalescence of the water-in-oil dispersion and a decrease in the water and oil surface area interface, there can occur a reduction in mass transfer rate of impurities and a slow down of the enzyme reaction. As a consequence, the enzymatic degumming reaction can require longer duration times.

The processed reacted mixture contained in the reactor 9, which can contain an oil phase and a water phase, exits the reactor 9 as stream 15, or a reacted mixture. Preferably, the oil phase of the reacted mixture 15 has an enhanced phospholipid removal content level. In one example, the oil phase of the reacted mixture 15 has a phosphorus content of less than 10 ppm, 8 ppm, 7 ppm, 6 ppm, 5 ppm, 4 ppm or 3 ppm of phosphorus.

Figure 2:
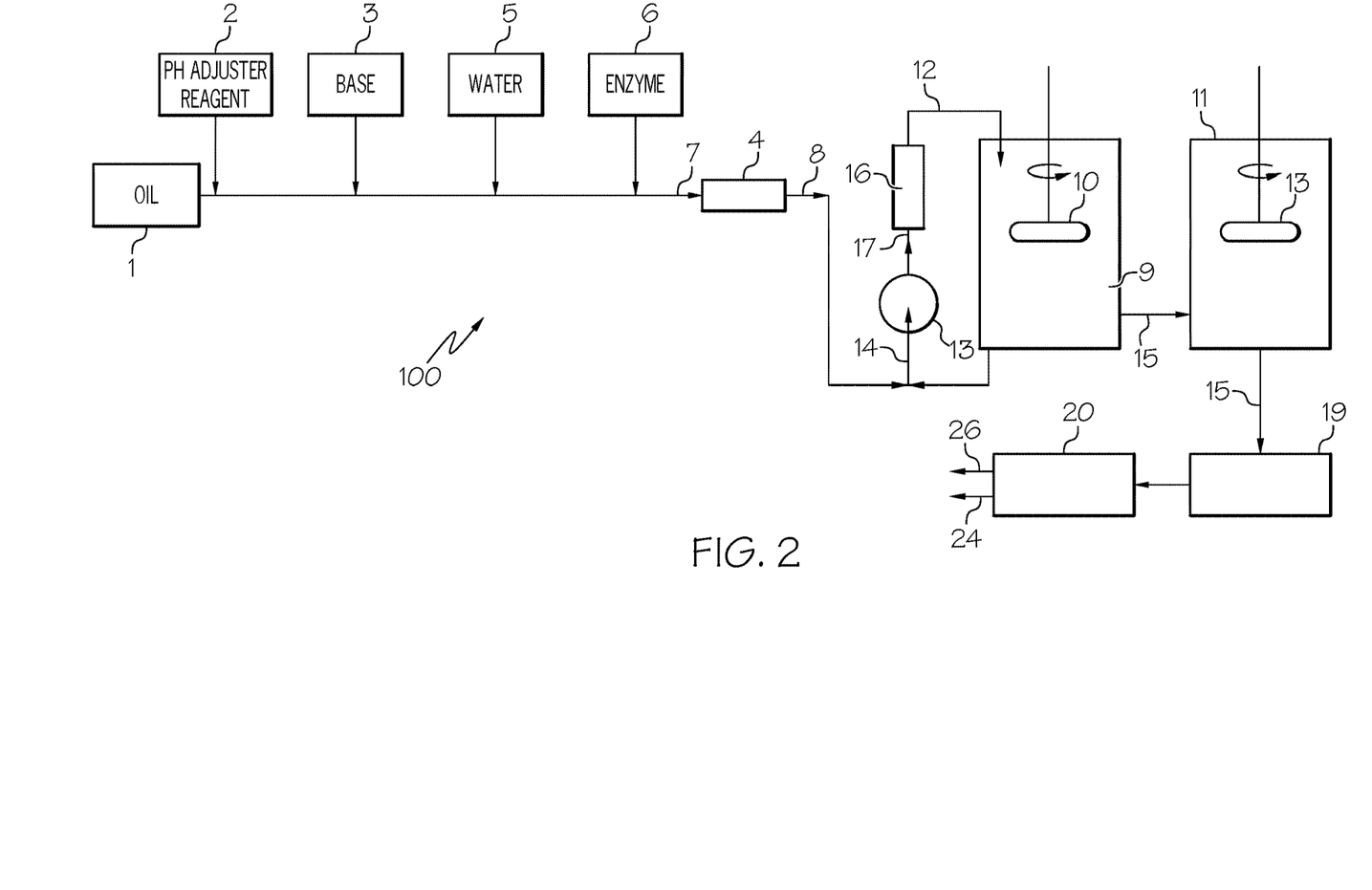
FIG. 2 shows a block flow diagram of an enzymatic oil degumming system using high shear mixing devices and multiple reactors.

As shown in FIG. 2, the reacted mixture 15 exiting the reactor 9 can be transferred into mixing chamber of a second reactor 11 equipped with mixing means 13. Mixing means can include agitators, mixers, impellers or the like, for instance, an top-mounted impeller on a metal tank. The reacted mixture 15 can be further mixed and retained in the second reactor 11 to further carryout the enzymatic reaction. The homogeneous reacted mixture 15 can be maintained by mixing for a period of 15 minutes to 24 hours, 30 minutes to 12 hours, 60 minutes to 6 hours, or 90 minutes or 2, 3, 4 or 5 hours. The reactor 11 can be jacketed or equipped with another heating apparatus, such as coils, for maintaining a desired holding temperature (not shown).

The reacted mixture 15, from either reactor 9, 11, can be further processed to prepare a degummed oil product having a reduced amount of impurities. For example, the reacted mixture 15 exiting the non-cavitational, mass transfer reactor 9 can be transferred to one or more separation phases to remove the added water, acid, base or other component or a portion thereof and impurities from the oil phase to create a degummed oil product. Prior to separation, the reacted mixture 15 can be transferred to a holding tank (not shown). The mixture 15 can be mixed or allowed to rest in the holding tank as desired. From the holding tank, the treated mixture 15 can be passed through a heat exchanger 19, to bring the mixture to desired temperature (e.g., 40 to 70° C.) prior to being processes in a separator. The mixture 15, containing a water phase and an oil phase, can be processed to separate 20 the phases.

Separation 20 of the water phase from the oil phase can be done with a decanter, centrifuge, hydrocyclone or similar separation equipment. The differences in densities of water and oil allows for a rapid and distinct separation of the two components. For example, if the separator is a gravity tank with a mixer or agitator, the residence time can be selected to allow for gravitational separation of the heavy phase and light phase as desired. Separation temperatures in a separation vessel can be adjusted as desired, for example, the separation temperature can be in the range of 20° C. to 150° C., 30° C. to 100° C. or 40° C. to 80° C. Preferably, the water and oil mixture can be introduced into a separation vessel at a temperature in the range of 20° C. to 60° C. From the separator 20, a water phase containing gums 24 and a degummed or purified oil 26 are formed. The purified oil 26 can be subjected to further processing steps known in the art including bleaching or deodorizing, as may be necessary or desirable depending on the end use for which the degummed oil product is intended.

The enzymatic degumming process disclosed herein optimizes conventional systems with the addition of a recirculation system to the reactor, in which a second high shear mixing device is used in conjunction with a first high shear mixing device upstream of the recirculation loop. The second high shear mixing device re-creates and maintains the enhanced oil and water surface interface area and high mass transfer rates between the oil and water to promote and enable efficient completion of the reaction of phospholipids with a reduced enzyme dose and reaction time. The degumming systems disclosed can increase the rate of an enzymatic reaction at about 3 to 6 times greater than the normal rate of the reaction. For example, the oil degumming system of the present disclosure can reduce reaction time of an enzymatic oil reaction by 50 to 1,000 percent, 75 to 500 percent, or 100 to 250 percent as compared to the reaction time of a system that does not utilize the recirculation system.

In some embodiments, the feed supply 7 is processed twice to form a fine emulsion prior to being mixed in the reactor 9. The supply 7 is passed through two mixing devices 4, 16, which this dual processing system promotes a higher reaction interface for the enzymes at an earlier part of the enzymatic reaction at about 1.5 to 3 times greater than the normal rate of the reaction. The reaction of the present disclosure also enables a more complete reaction of phospholipids with minimal enzyme dosage and reduced reaction time. Reducing the reaction time needed to complete or substantially complete the phospholipid reaction also can have significant positive impact on the overall economic value of enzymatic degumming processes.

The oil degumming methods described herein can be carried out at different temperatures, for instance, at any temperature deemed suitable by one of skill in the art. In certain embodiments, the temperature during the process is in the range from about 20° C. to 110° C. In certain embodiments, the temperature during the process is about 20, 30, 40, 50 60, 70, 80, 90, 100 or 110° C.

The degummed oil product 26 resulting from separation of water and impurities or gums, such as soaps and phosphatides, has an improved quality. The phosphorus content of the degummed oil product can be less than 10 ppm, 8 ppm, 6 ppm, 5 ppm, 4 ppm, 3 ppm or 2 ppm, whereas the starting phosphatide or phosphorus content of the oil being fed to the hydrodynamic cavitation device can be in the range of 200 to 1200 for crude oils and 30 to 200 for water degummed oils as discussed above. The degumming method described herein can result in a purified oil product having a reduction in phosphorus or phosphatide content of at least 97, 97.5, 98, 98.5, 99 or 99.5 weight percent, as compared to the oil being fed to the process or being used to form the feed supply.

In order to promote a further understanding of the invention, the following examples are provided. These examples are shown by way of illustration and not limitation.

EXAMPLE 1

800 g crude soybean oil with a residual phosphorus content of 672 ppm was heated to a temperature of approximately 70° C. in a reservoir. 0.8 grams of a concentrated (50 wt %) citric acid solution was added to the heated oil, followed by 40 minutes of mixing with an overhead stirrer in the reservoir at a speed of 500 rpm. The oil and acid mixture was then placed into a hoper connected to a pump entrance and allowed to cool with agitation to a temperature of 40° C. 0.72 milliters of a dilute (80 wt %) caustic soda solution was added to the hoper and mixed with a 500 rpm speed agitator for 1 minute to mixture having a pH of 4.5. Then 25 grams of a deionized water and 0.04 gram of Lecitase Ultra phospholipase A1 (Novozymes) was added to the mixture and then gently mixed to form a feed supply.

The feed supply was transferred from the hoper by the pump at a pressure 180 psi through a high shear hydrodynamic cavitation mixing device having a nozzle with a 0.5 mm opening to generate a field of hydrodynamic cavitation bubbles. The feed supply mixture was passed through the cavitation device only once to form a pre-mixed feed stock. The cavitation bubbles were collapsed and the pre-mixed feed stock was the stock was transferred back into the reservoir.

The pre-mixed feed stock was agitated in the reservoir at a speed of 500 rpm for a period of 240 minutes at a temperature of 40° C. Samples of the reservoir contents were taken at 20-minute intervals during mixing. The samples were centrifuged to separate the oil component, which was collected and analyzed to determine residual phosphorus level in the purified oil.

The residual phosphorus content in the purified oil taken at 20 minutes was 70.5 ppm. The residual phosphorus content in the purified oil collected at 120 and 240 minutes was 18.3 and 9.2 ppm, respectively.

EXAMPLE 2

800 g crude soybean oil with a residual phosphorus content of 655 ppm was heated to a temperature of approximately 70° C. in a reservoir. 0.8 grams of a concentrated (50 wt %) citric acid solution was added to the heated oil, followed by 40 minutes of mixing with an overhead stirrer in the reservoir at a speed of 500 rpm. The oil and acid mixture was then placed into a hoper connected to a pump entrance and allowed to cool with agitation to a temperature of 40° C. 0.72 milliters of a dilute (80 wt %) caustic soda solution was added to the hoper and mixed with a 500 rpm speed agitator for 1 minute to mixture having a pH of 4.5. Then 25 grams of a deionized water and 0.04 gram of Lecitase Ultra phospholipase A1 (Novozymes) was added to the mixture and then gently mixed to form a feed supply.

The feed supply was transferred from the hoper by the pump at a pressure 180 psi through a high shear hydrodynamic cavitation mixing device having a nozzle with a 0.5 mm opening to generate a field of hydrodynamic cavitation bubbles. The feed supply mixture was passed through the cavitation device to form a pre-mixed feed stock. The cavitation bubbles were collapsed and the pre-mixed feed stock was the stock was transferred back into the hoper.

The pre-mixed feed stock was agitated in the hoper at a speed of 500 rpm for a period of 40 minutes at a temperature of 40° C. During agitation, the contents of the hoper were re-circulated through the static hydrodynamic cavitation device for the entire 40 minutes, wherein one recirculation cycle was 2.27 minutes. Based on the recirculation cycle, the contents of the hoper were passed through the static hydrodynamic cavitation device 17 times. Samples of the reservoir contents were taken at 20-minute intervals during mixing. The samples were centrifuged to separate the oil component, which was collected and analyzed to determine residual phosphorus level in the purified oil.

The residual phosphorus content in the purified oil taken at 20 minutes was 7.4 ppm. The residual phosphorus content in the purified oil collected at 40 minutes was 2.6 ppm.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. An enzymatic degumming system comprising:
    a first high shear mixing device comprising an inlet and an outlet, the first high shear mixing device connected to a feed supply comprising an oil comprising non-hydrated phospholipids, water and enzyme, the first high shear mixing device capable of mixing the feed supply to produce pre-mixed feed stock;
    a reactor comprising a reactor inlet, a reactor outlet, a mixing chamber and an agitator arranged in the mixing chamber, the reactor outlet connected to a recirculation system positioned outside the reactor;
    the recirculation system comprising a pump comprising a pump inlet and a pump outlet, the pump inlet in fluid communication with the outlet of the reactor and the outlet of the first high shear mixing device;
    a second high shear mixing device comprising an inlet and an outlet, the inlet of the second high shear mixing device in fluid communication with the pump outlet and the outlet of the second high shear mixing device in fluid communication with the reactor inlet, wherein the second high shear mixing device is a cavitation device.

2. The enzymatic degumming system of claim 1, wherein the first high shear mixing device is selected from a group consisting of a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device.

3. The enzymatic degumming system of claim 1, wherein at least one of the first high shear mixing device and the second high shear mixing device comprises an inline device.

4. The enzymatic degumming system of claim 1, wherein the oil is selected from the group consisting of vegetable oil, acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil, walnut oil and a combination thereof.

5. The enzymatic degumming system of claim 1, wherein the feed supply further comprises a pH adjuster reagent.

6. The enzymatic degumming system of claim 1, wherein the feed supply further comprises a base selected from the group consisting of sodium hydroxide, potassium hydroxide, sodium silicate, sodium carbonate, calcium carbonate, and a combination thereof.

7. The enzymatic degumming system of claim 1, wherein the reactor is in fluid communication with a downstream post-reaction network comprising a heat exchanger and a separator.

8. The enzymatic degumming system of claim 1, wherein the first high shear mixing device comprises a flow capacity and the flow capacity of the first high shear mixing device is greater than the second high shear mixing device.

9. The enzymatic degumming system of claim 1, wherein a second reactor is in fluid communication with and downstream of the reactor.

10. The enzymatic degumming system of claim 1, wherein the first high shear mixing device is a static hydrodynamic cavitation device.

11. The enzymatic degumming system of claim 1, wherein the second high shear mixing device is a static hydrodynamic cavitation device.

12. A method of degumming oil, the method comprising:
    passing a feed supply through a first high shear mixing device to form a premixed feedstock, the feed supply comprising an oil comprising non-hydrated phospholipids, water, a pH adjuster reagent, a base and enzyme;
    charging the pre-mixed feedstock to a mixing chamber of a reactor to form a reaction mixture;
    mixing the reaction mixture in the mixing chamber of the reactor with an agitator;
    recirculating the reaction mixture in the mixing chamber repeatedly through a recirculation system positioned outside of the reactor, the recirculation system comprising a second high shear mixing device, wherein the second high shear mixing device is a cavitation device, wherein the recirculation system reintroduces the reaction mixture to the reactor to form a reacted mixture;
    discharging the reacted mixture from the reactor to a downstream post-reaction network comprising a heat exchanger and a separator;
    passing the reacted mixture through the heat exchanger and separator, wherein the separator generates a degummed oil product.

13. The method of claim 12, wherein the oil comprises a crude vegetable oil or a water-degummed vegetable oil and the pH adjuster reagent comprises an aqueous acid solution.

14. The method of claim 12, wherein the pre-mixed feedstock is passed through the recirculation system before being introduced into the mixing chamber of the reactor.

15. The method of claim 12, wherein the recirculating system further comprises a pump, the pump comprising a pump inlet and a pump outlet.

16. The method of claim 12, wherein the pre-mixed feedstock and the reaction mixture are combined together in the second high shear mixing device.

17. The method of claim 12, wherein the first high shear mixing device is selected from a group consisting of a high-speed pump, colloid mill, high-pressure jet nozzle, static mixer, high-pressure valve type homogenizer, turbine type rotor-rotor homogenizer, turbine type rotor-stator homogenizer, dynamic hydrodynamic cavitation device, static hydrodynamic cavitation device and ultrasonic cavitation device.

18. The method of claim 12, wherein the first high shear mixing device and the second high shear mixing device are both hydrodynamic static cavitation devices, the hydrodynamic cavitation devices each comprising a local constriction.

19. The enzymatic degumming system of claim 1, wherein the second high shear mixing device is a hydrodynamic cavitation device.

* * * * *